US007729350B2

(12) United States Patent
Singh et al.

(10) Patent No.: US 7,729,350 B2
(45) Date of Patent: Jun. 1, 2010

(54) VIRTUAL MULTICAST ROUTING FOR A CLUSTER HAVING STATE SYNCHRONIZATION

(75) Inventors: Ravi I. Singh, Sunnyvale, CA (US); Rahul Bahadur, Mountain View, CA (US); Peter Frederick Hunt, Sunnyvale, CA (US)

(73) Assignee: Nokia, Inc., Irving, TX (US)

( * ) Notice: Subject to any disclaimer, the term of this patent is extended or adjusted under 35 U.S.C. 154(b) by 950 days.

(21) Appl. No.: 11/027,018

(22) Filed: Dec. 30, 2004

(65) Prior Publication Data

US 2006/0146821 A1 Jul. 6, 2006

(51) Int. Cl.
H04L 12/56 (2006.01)
(52) U.S. Cl. .................................. 370/390; 370/432
(58) Field of Classification Search ................. None
See application file for complete search history.

(56) References Cited

U.S. PATENT DOCUMENTS

| 4,736,393 | A | * | 4/1988 | Grimes et al. | 375/356 |
| 5,331,637 | A | * | 7/1994 | Francis et al. | 370/408 |
| 5,608,726 | A | * | 3/1997 | Virgile | 370/401 |
| 6,006,259 | A | | 12/1999 | Adelman et al. | |
| 6,078,957 | A | | 6/2000 | Adelman et al. | |
| 6,134,587 | A | * | 10/2000 | Okanoue | 709/222 |
| 6,192,417 | B1 | | 2/2001 | Block et al. | |
| 6,795,433 | B1 | | 9/2004 | Li | |
| 6,947,384 | B2 | * | 9/2005 | Bare | 370/235 |
| 7,246,261 | B2 | * | 7/2007 | Miller et al. | 714/7 |
| 2002/0165964 | A1 | | 11/2002 | Chen et al. | |
| 2005/0066056 | A1 | * | 3/2005 | Dominic | 709/245 |
| 2005/0188114 | A1 | * | 8/2005 | Williams | 709/250 |

FOREIGN PATENT DOCUMENTS

WO    WO-01/18641 A1    3/2001

OTHER PUBLICATIONS

Notification of Transmittal of the International Search Report and the Written Opinion of the International Searching Authority, or the Declaration, pp. 1-9, dated May 4, 2006.

(Continued)

*Primary Examiner*—Robert W Wilson
(74) *Attorney, Agent, or Firm*—Alston & Bird LLP

(57) ABSTRACT

A system, apparatus, and method are directed to managing multicast routing using a network cluster. A cluster master actively participates in multicast control protocol communications with the cluster neighbors, while non-master member nodes, do not participate in the protocols' operation outside of the cluster. However, each cluster member maintains virtually the same protocol state, such that should the master become unavailable, another cluster member may assume the master role with minimum delay. New members to the cluster are synchronized by receiving initial protocol state information from the master. After the initial protocol state synchronization, cluster members actively monitor the network to acquire new protocol state information. In addition, cluster members exchange protocol state information between themselves that may not be obtainable off the network. Filtering of multicast data packets is performed by each cluster member, to load balance multicast data traffic across the cluster members.

47 Claims, 4 Drawing Sheets

OTHER PUBLICATIONS

Andrew Adams, Jonathan Nicholas and William Siadak, "Protocol Independent Multicast—Dense Mode (PIM-DM): Protocol Specification (Revised)" (Jan. 2005) <www.ietf.org/rfc/rfc3973.txt?number=3973>.

Deborah Estrin, Dino Farinacci, Ahmed Helmy, David Thaler, Stephen Deering, Mark Handley, Van Jacobson, Ching-Gung Liu, Pouneet Sharma, Limin Wei, "Protocol Independent Multicast-Sparse Mode (PIM-SM): Protocol Specification" (Jun. 1998) <www.ietf.org/rfc/rfc2362.txt?number=2362>.

William C. Fenner, "Internet Group Management Protocol, Version 2" (Nov. 1997) <www.ietf.org/rfc/rfc2236.txt?number=2236>.

* cited by examiner

VIRTUAL MULTICAST ROUTING FOR A CLUSTER HAVING STATE SYNCHRONIZATION

FIELD OF THE INVENTION

The invention relates generally to computing management, and more particularly but not exclusively to a method and system for managing multicast routing within a cluster having state synchronization.

BACKGROUND OF THE INVENTION

Multicasting is a way for efficiently delivering content over packet-based networks. A single packet originated at a source may be used to provide the content of the packet to multiple receivers on the network. The group of receivers interested in receiving certain media content, from the source, may be located all over a network and even across disparate networks. There usually is a certain most-preferred path for delivering content to each of the receivers. If the paths from the source to each of the receivers were to be collated, there may likely be overlaps in the paths. The degree of the overlaps will vary based on a location of the various receivers. The path from the source to the various receivers when represented using a network graph is typically called a content delivery tree, where vertices of the graph correspond to routers and edges to a network transport between the routers. In such a group of nodes, including the receivers and the sender, the sender could send multiple copies of each of the packets, one to each of the interested receivers. Another multicast routing protocol approach to achieve the same end result of packet delivery to each of the receivers is by generating a single copy of each packet at the source and replicating each packet at the forks in the tree. This tree corresponds to the shared path on which multicast data bound for a particular group address is forwarded. When there are a large number of senders and a large number of interested receivers per sender, the benefits of originating only one copy of each packet at the source and replicating each of the packets at each fork in the delivery tree becomes apparent with respect to savings in bandwidth utilized in transferring content.

However, there are several innate problems with multicast routing protocols. For example, as described above, there may be at least one node within the tree that receives a large amount of traffic, thereby creating a potential bottleneck on traffic throughput. Moreover, there may be a chance that the multicast traffic loads may be unevenly distributed among other nodes in the tree resulting in under-utilization of other potential paths.

In addition, many businesses may utilize multicast protocols, and similar networking infrastructures, to manage critical applications, access content servers, automate assembly and production lines, and implement complex control systems. Such reliance by businesses has driven the demand for higher protection and availability guarantees to resources over the network. Unfortunately, an interface failure, or router failure within the multicast tree may result in significant costs to the business. Therefore, there is a need in the industry for improved approaches to managing multicast routing over a network.

SUMMARY OF THE INVENTION

This summary of the invention section is intended to introduce the reader to aspects of the invention and is not a complete description of the invention. Particular aspects of the invention are pointed out in other sections herein below and the invention is set forth in the appended claims, which alone demarcate its scope.

The present invention is a directed to managing multicast routing using a network cluster. Use of a network cluster architecture is directed towards addressing several identified issues with multicast routing protocols, including load-balancing support, and multicast router failovers. Thus, the present invention includes a cluster master that actively participates in multicast control protocol communications with cluster neighbors. To maintain an illusion of a single multicast neighbor router, non-master cluster members, do not participate in the protocols' operation outside of the cluster. However, each cluster member maintains virtually the same protocol state, such that should the cluster master become unavailable, another cluster member may assume the cluster master role with minimum delay. In addition, filtering of multicast data packets is performed by each cluster member, to load balance multicast data traffic across the cluster members.

In one aspect of the invention, a system is directed to managing multicast routing over a network. The system includes a first and second network device. The first network device is configured to operate as a cluster master within a cluster. The second network device configured to operate as the cluster member. The first network device is further configured to send initial protocol state information to a cluster member, if the cluster member is joining the cluster; and to send a multicast control protocol packet to at least one network device external to the cluster. The first network device may receive a multicast data packet. If the first network device is associated with the multicast data packet, it forwards the multicast data packet towards a destination. The second network device is configured to receive the initial protocol state information and to monitor the network for additional protocol state information. If additional protocol state information is received, the second network device employs the additional protocol state information to update its state. The second network device may also receive a multicast data packet, and if the second network device is associated with the multicast data packet, it forwards the multicast data packet towards a destination.

In another aspect of the invention, an apparatus is directed to managing multicast routing over a network. The apparatus includes a multicast cluster manager, among other components, that is configured to perform actions. The actions include configuring the apparatus to operate as a member within a cluster; monitoring the network for protocol state information, and if protocol state information is received, employing the protocol state information to update a state of the apparatus. In addition, the multicast cluster manager is configured to receive a multicast control protocol message, and if the apparatus is a cluster master, the multicast cluster manager responds to the multicast control protocol message. If the apparatus is other than the cluster master, the multicast cluster manager drops the multicast control protocol message rather than responding to it. When the apparatus receives a multicast data packet, and if the apparatus is associated with the multicast data packet, the multicast cluster manager forwards the multicast data packet towards a destination.

In yet another aspect of the invention, a method is directed to managing a multicast routing over a network. The method sends initial protocol state information to a cluster member, if the cluster member is joining the cluster. The method includes sending, from a cluster master, a multicast control protocol packet to at least one network device external to the cluster. The method further includes receiving another multicast control protocol packet from the external network device, and if the multicast control protocol packet is received by the cluster member, dropping the multicast control protocol packet. The method also includes monitoring the network for additional protocol state information, and if additional protocol state information is received, employing the additional protocol state information to update a state of the cluster member. In addition, the method includes receiving a multicast data packet, and if the cluster member is associated with the multicast data packet, forwarding the multicast data packet towards a destination.

In one embodiment of the method, if another multicast protocol state that is known by the one of the cluster master and the cluster member is unobtainable by another cluster member by monitoring the multicast protocol state, the method further includes sending the other multicast protocol state to the other cluster member, such that if one of the cluster master and the cluster member fail, the other cluster member is enabled to assume a workload and role of the failed one of the cluster master and the cluster member.

Other features and advantages of the present invention will become apparent from the following Detailed Description of the Invention read in conjunction with the accompanying drawings.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

Figure 1:
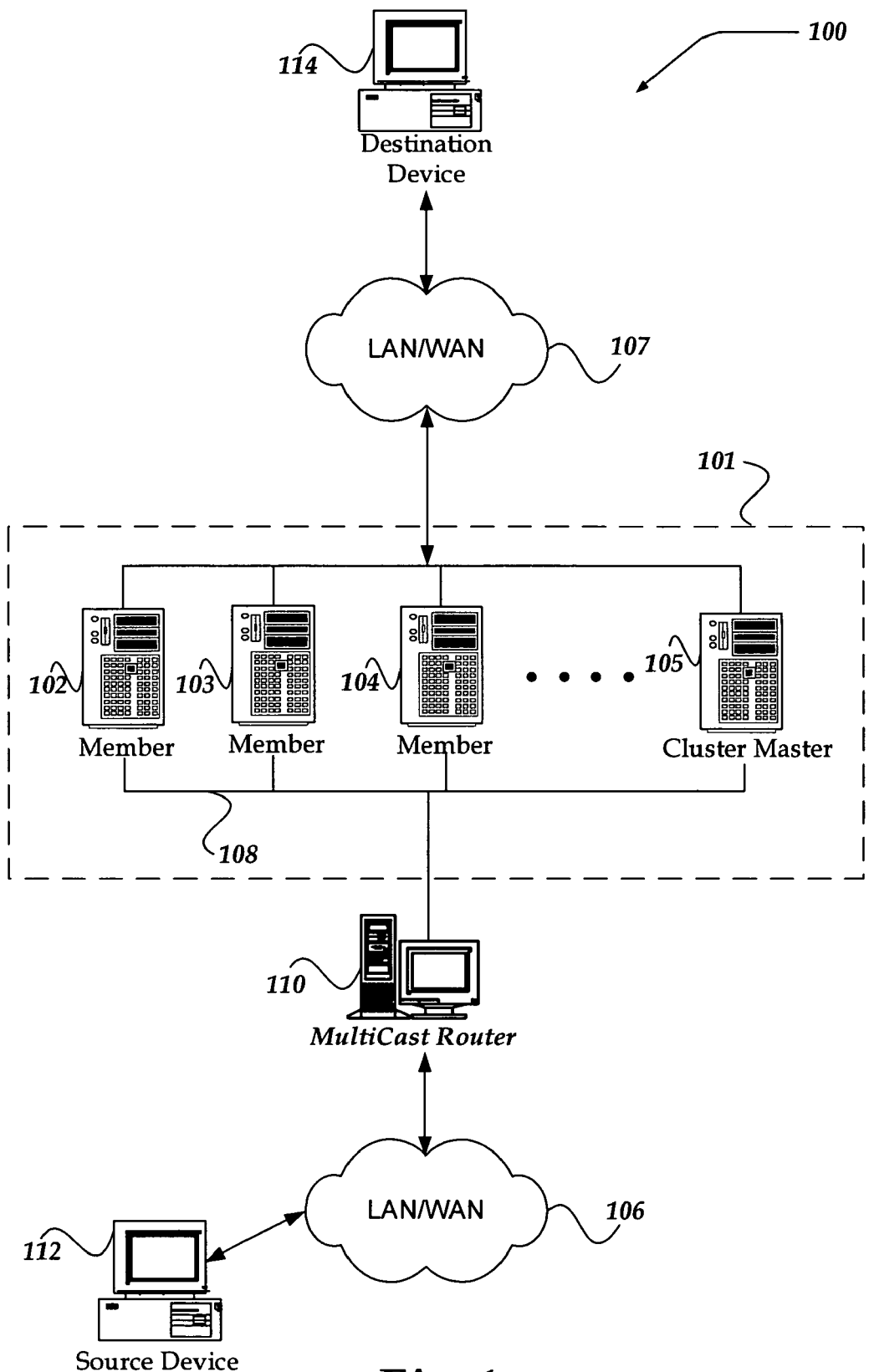
FIG. 1 shows a functional block diagram illustrating one embodiment of a multicast cluster environment for practicing the invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Network clustering is a way to provide high availability and increased performance for a computer server or network device. A group of servers or devices configured as a cluster maintain the illusion of a single server or device to external network entities. The cluster is identified on each network by a cluster IP (Internet Protocol) address. Cluster members may exchange cluster protocol messages with each other to dynamically change the cluster membership (i.e. add or remove members), detect member failure, distribute work among members, or detect member failure. One member of the cluster may be statically or dynamically nominated as the cluster master, and may coordinate events between cluster members (including itself).

When a new server or network device joins the cluster, it can assume some of the load of the other members, thereby increasing the capacity or performance of the cluster. If one cluster member suffers partial or complete failure of critical function, it can leave the cluster, and another cluster member can assume its workload. Cluster members may periodically exchange state information to enable any cluster member to take over the workload of any other member. In this way, network clustering can provide high availability and scalable performance of a network service or device. Thus, it is with respect to these considerations and others that the present invention has been made.

Briefly stated, the invention is directed towards a system, apparatus, and method for providing high availability and increased performance for a multicast router, using a network cluster configuration. In the cluster configuration, the cluster master actively participates in multicast control protocol communications with the cluster's multicast router neighbors, thereby maintaining an illusion of a single multicast router device. The cluster master employs the cluster Internet Protocol (IP) address as a source for originating multicast control protocol packets from the cluster. Non-master nodes, or cluster member nodes, do not typically participate in the multicast control protocols' operation outside of the cluster. However, each of the members of the cluster maintains virtually the same protocol state, such that should the cluster master become unavailable, another member of the cluster may assume the cluster master role with minimum delay. Newly joining members to the cluster are synchronized by receiving initial protocol state information from the cluster master. After the initial protocol state synchronization, cluster members actively monitor the multicast control protocol traffic on the network to acquire new protocol state information. In addition, cluster members exchange between themselves the protocol state information that may not be obtainable off the network. Moreover, filtering of multicast data packets is performed by each cluster member to load balance multicast data traffic across the cluster members.

Illustrative Operating Environment

FIG. 1 illustrates one embodiment of an environment in which the invention may operate. Not all the components may be required to practice the invention, and variations in the arrangement and type of the components may be made without departing from the spirit or scope of the invention.

As shown in the figure, cluster system 100 includes Local Area Network/Wide Area Networks (LAN/WANs) 106 and 107, destination device 114, source device 112, multicast router 110, and multicast cluster 101. Multicast cluster 101 includes cluster members 102-104, and cluster master 105. Multicast cluster 101 is in communication with LAN/WANs 106 and 107. Destination device 114 is in communication with LAN/WAN 107, and source device 112 is in communication with LAN/WAN 106.

Cluster members 102-104, and cluster master 105 may be in communication with LAN/WANs 106 and 107 through a plurality of networks. For example, although not illustrated, a plurality of network connections may exist between cluster members 102-104, cluster master 105 and LAN/WAN 107. A plurality of network connections may further exist between cluster members 102-104, cluster master 105 and LAN/WAN 106. However, for clarity, only network 108 is illustrated in FIG. 1. Network 108 may include virtually any local area network (LAN), including, but not limited to Ethernet, 802.3, and the like. In one embodiment, network 108 is a protocol network. A protocol network includes virtually any network, including its interconnections, and the like, that is employed for an exchange of a protocol message.

Multicast cluster 101 typically is configured to include loosely coupled network devices that may cooperate to provide another device with access to a service, resource, and the like. In one embodiment, multicast cluster 101 is configured to optimize a message throughput by adaptively load balancing cluster members 102-104. Multicast cluster 101 may employ virtually any load balancing mechanism including round trip time, round robin, least connections, packet completion rate, quality of service, cluster topology, global availability, hops, a hash, static ratios, and dynamic ratios. In one embodiment, a multicast data packet can map to a cluster member's work assignment using a hash-based scheme, and the like, substantially similar to that employed for unicast traffic.

Multicast cluster 101 may further be configured to provide a variety of network management services, including, but not limited to Domain Name Services, security services, and the like.

Cluster members 102-104 may be any network device capable of sending and receiving a packet over the network in a cluster architecture. One embodiment of a cluster member, such as cluster members 102-104, is described in more detail in conjunction with FIG. 3.

In one embodiment, cluster members 102-104 are configured to operate as a protocol stack processor for a received message packet. The set of such devices may include devices that typically connect using a wired communications medium such as personal computers, multiprocessor systems, microprocessor-based or programmable consumer electronics, network PCs, and the like, that are configured to operate as a cluster device. The set of such devices may also include devices that typically connect using a wireless communications medium such as a mobile device, including but not limited to cell phones, smart phones, pagers, walkie talkies, radio frequency (RF) devices, infrared (IR) devices, laptops, CBs, integrated devices combining one or more of the preceding devices, and the like, that are configured as a cluster device. Alternatively, cluster members 102-104 may be any device that is capable of connecting using a wired or wireless communication medium such as a PDA, POCKET PC, wearable computer, and any other device that is equipped to communicate over a wired and/or wireless communication medium, operating as a cluster device.

Moreover, each of cluster member within cluster members 102-104 may include an application, and the like, that is configured to communicate a packet between itself and cluster master 105. The application may, for example, receive synchronization protocol state data from cluster master 105 when the cluster member joins the cluster. Cluster members 102-104 may then employ the application to monitor network 108 to acquire additional protocol state information. Such protocol state information may enable cluster members 102-104 to update their respective routing tables, including their multicast and unicast routing tables, and related information. As such, protocol state information may include information about a member's immediate neighbors, senders, receivers, distance information, multicast tree information, and so forth. The application may further enable a cluster member to provide its own protocol state information to another cluster member, such that the other cluster member may assume its role, should the cluster member fail.

Multicast cluster 101 and cluster members 102-104 are not constrained to the above mechanism for maintaining state synchronization, however. For example, cluster members 102-104 may employ a full synchronization mechanism, wherein cluster master 105 virtually constantly synchronizes protocol state information by sending it to cluster members 102-104. In this mechanism, cluster members 102-104 are virtually solely reliant on cluster master 105 for acquiring protocol state information. Synchronization may also be accomplished employing a 'monitor only' mechanism, wherein cluster master 105 does not synchronize any protocol state information to cluster members 102-104. Rather, cluster members 102-104 are solely reliant on the traffic they monitor from network 108, to acquire the protocol state information. Thus, cluster members 102-104 may employ virtually any synchronization mechanism, without departing from the scope or spirit of the invention.

Each cluster member within cluster members 102-104 may apply a filter application to the multicast protocol control and data packets it receives to determine how to process them. For example, based on the load-balancing mechanism, one cluster member may be assigned to forward a received multicast data packet towards its destination, while the other cluster members may simply drop the multicast data packet.

Cluster members 102-104 may also include an application residing within it that may join a group associated with a particular traffic flow of packets. For example, in one embodiment, cluster member 102 may include an application that seeks access to a particular traffic flow. In this instance, cluster member 102 may be configured to receive the multicast data packets that are associated with the traffic flow for the application, and rather than drop the multicast data packets, would pass the multicast data packets on to its resident application. Cluster member 102 may perform such actions independent of whether or not it also forwards the multicast data packets towards a destination external to multicast cluster 101, such as source device 112, destination device 114, and the like.

Cluster master 105 includes virtually any network device that is configured to operate as a cluster management network device to enable change management of the cluster configuration. The set of such devices may include, but is not limited to personal computers, multiprocessor systems, microprocessor-based or programmable consumer electronics, network PCs, mobile devices, including, but not limited to cell phones, smart phones, pagers, walkie talkies, radio frequency (RF) devices, infrared (IR) devices, CBs, integrated devices combining one or more of the preceding devices, a PDA, POCKET PC, wearable computer, and any other device that is equipped to communicate over a wired and/or wireless communication medium, to manage configuration changes to multicast cluster 101. In one embodiment, virtually any of the cluster members 102-104 may be configured to assume the role of cluster master 105, should cluster master 105 become unavailable. Thus, the configurations of cluster members 102-104 and cluster master are typically substantially the same.

In one embodiment, although each member, including the cluster master, receives all the multicast protocol control and data packets, it is cluster master 105 that actively participates in the multicast control protocol operations. In one embodiment, cluster master 105 employs a cluster IP address as a source of originated multicast packets. Cluster members 102-104 do not, typically, participate in the multicast control protocols' operation. That is, cluster master 105 is configured to respond for multicast cluster 101, so as to maintain an illusion of a single multicast neighbor network device.

LAN/WANs 106 and 107 are enabled to employ any form of computer readable media for communicating information from one electronic device to another. Also, LAN/WANs 106 and 107 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, connections based on a variety of standards, including IEEE 802.11a, 802.11g, 802.11b, or any other communications links.

LAN/WANs 106 and 107 may further employ a plurality of wireless access technologies including, but not limited to, 2nd generation (2G), 3rd generation (3G) radio access for cellular systems, Wireless-LAN, Wireless Router (WR) mesh, and the like. Access technologies such as 2G, 3G, and future access networks may enable wide area coverage for mobile devices, with various degrees of mobility. For example, LAN/WANs 106 and 107 may enable a radio connection through a radio network access such as Global System for Mobil communication (GSM), General Packet Radio Services (GPRS), Enhanced Data GSM Environment (EDGE), Wideband Code Division Multiple Access (WCDMA), 802.16, and the like.

Furthermore, remote computers and other related electronic devices could be remotely connected to either LANs or WANs via a modem and temporary telephone link. In essence, LAN/WANs 106 and 107 includes any communication method by which information may travel between one network device and another network device.

Additionally, LAN/WANs 106 and 107 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Typically, LAN/WAN 106 may include a content server, application server, and the like, to which multicast cluster 101 enables access to for another network device residing within LAN/WAN 107. Similarly, LAN/WAN 107 may also include a content server, application server, and the like that may employ multicast cluster 101 to enable access to a network device residing within LAN/WAN 106. As illustrated in FIG. 1, source device 112 and destination devices 114 are examples of two network devices that may employ multicast cluster 101 to enable communications. In one embodiment, source device 112 may be configured to provide a multicast message that is destined also towards destination device 114. Although, labeled as a destination device, destination device 114 may also provide a multicast message that includes source device 112 as a destination for the message.

For illustrative purposes, multicast router 110 is also shown in FIG. 1 as a possible router interfacing with multicast cluster 101. Thus, multicast router 110 may be configured to receive multicast messages and forward them towards a neighbor network device. Multicast router 110 may also be represented by a bridge, switch, gateway, and the like, configured to receive and forward multicast messages.

Figure 2:
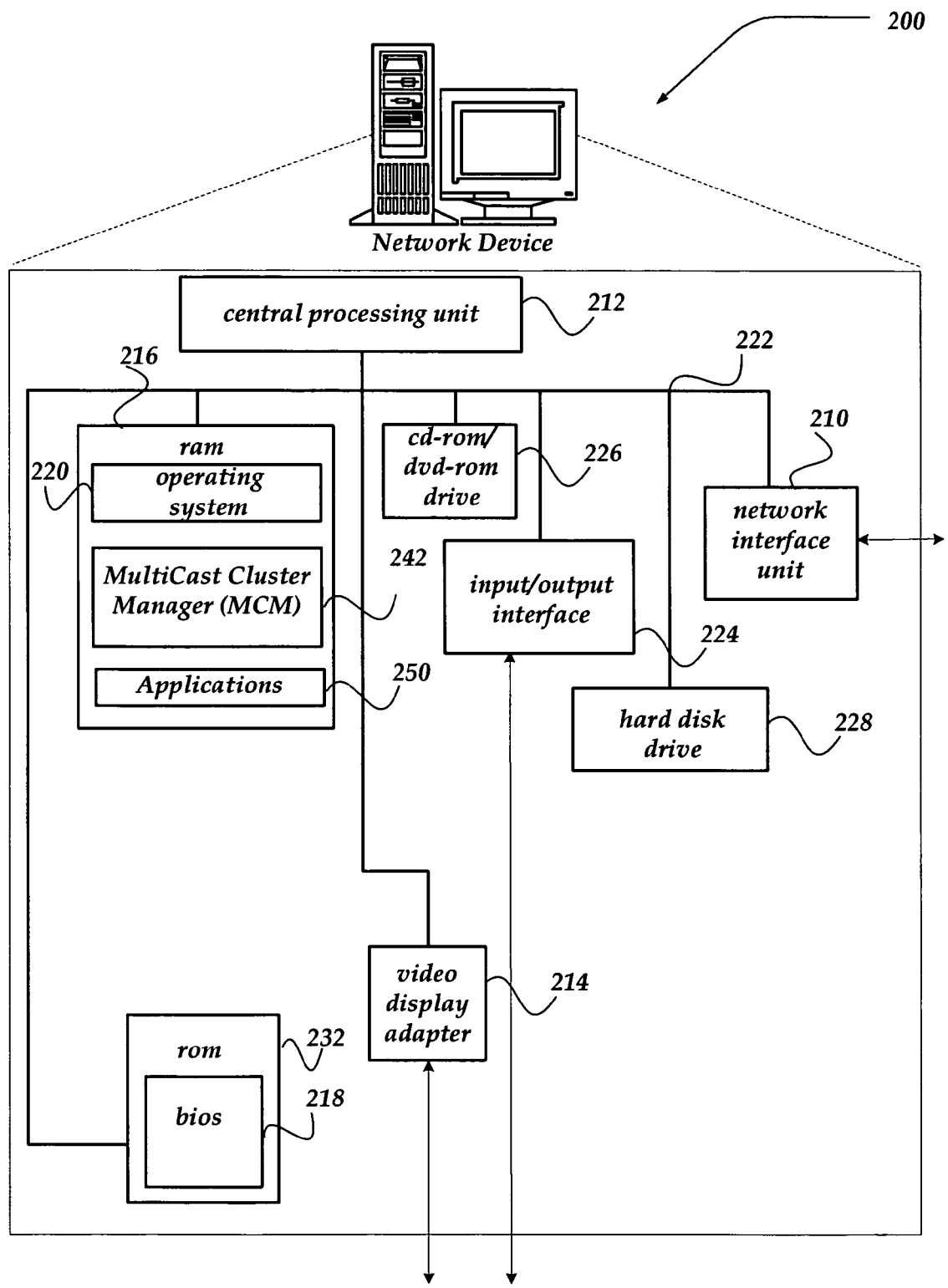
FIG. 2 shows one embodiment of a network device that may be employed in a system implementing the invention.

FIG. 2 illustrates a functional block diagram of one embodiment of a network device 200, which may operate as a cluster member and/or a cluster master. Network device 200 may include many more components than those shown. The components shown, however, are sufficient to disclose an illustrative embodiment for practicing the invention.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200.

As illustrated in FIG. 2, network device 200 also can communicate with the Internet, or some other communications network, such as LAN/WANs 106-107 in FIG. 1 via network interface unit 210, which is constructed for use with various communication protocols including, but not limited to the TCP/IP protocol, UDP/IP protocol, and the like. Network interface unit 210 is sometimes known as a transceiver or transceiving device.

Network device 200 may also include an SMTP handler application for transmitting e-mail, an HTTP handler application for receiving and handing HTTP requests, and an HTTPS handler application for handling secure connections. The HTTPS handler application may initiate communication with an external application in a secure fashion. Network device 200 is not limited however, to these handler applications, and many other protocol handler applications may be employed by network device 200 without departing from the scope of the invention.

Network device 200 may also include input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 is utilized by network device 200 to store, among other things, application programs, databases, and the like.

The mass memory as described above illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

In one embodiment, the mass memory stores program code and data for implementing operating system 220. The mass memory may also store additional program code and data for performing the functions of network device 200. One or more applications 250, and the like, may be loaded into mass memory and run on operating system 220. As shown in the figure, Multicast Cluster Manager (MCM) 242 is an example of an application that may run on operating system 220.

MCM 242 may be configured to enable a computing device to join the cluster as a cluster member and received protocol state information, configuration information, and the like, from cluster master 105. MCM 242 may also enable the cluster member to operate as a member in the cluster by filtering data packets, managing protocol packets, and synchronizing protocol state information with other members (and cluster master 105) of multicast cluster 101. Furthermore, MCM 242 may further enable the cluster member to assume the role of a master to the cluster, should cluster master 105 fail, and/or assume responsibilities for managing data traffic should another cluster member fail, and the like. MCM 242 may employ processes 300 and 400 of FIGS. 3 and 4, respectively, to perform many of these actions.

Illustrative Operation

Figure 3:
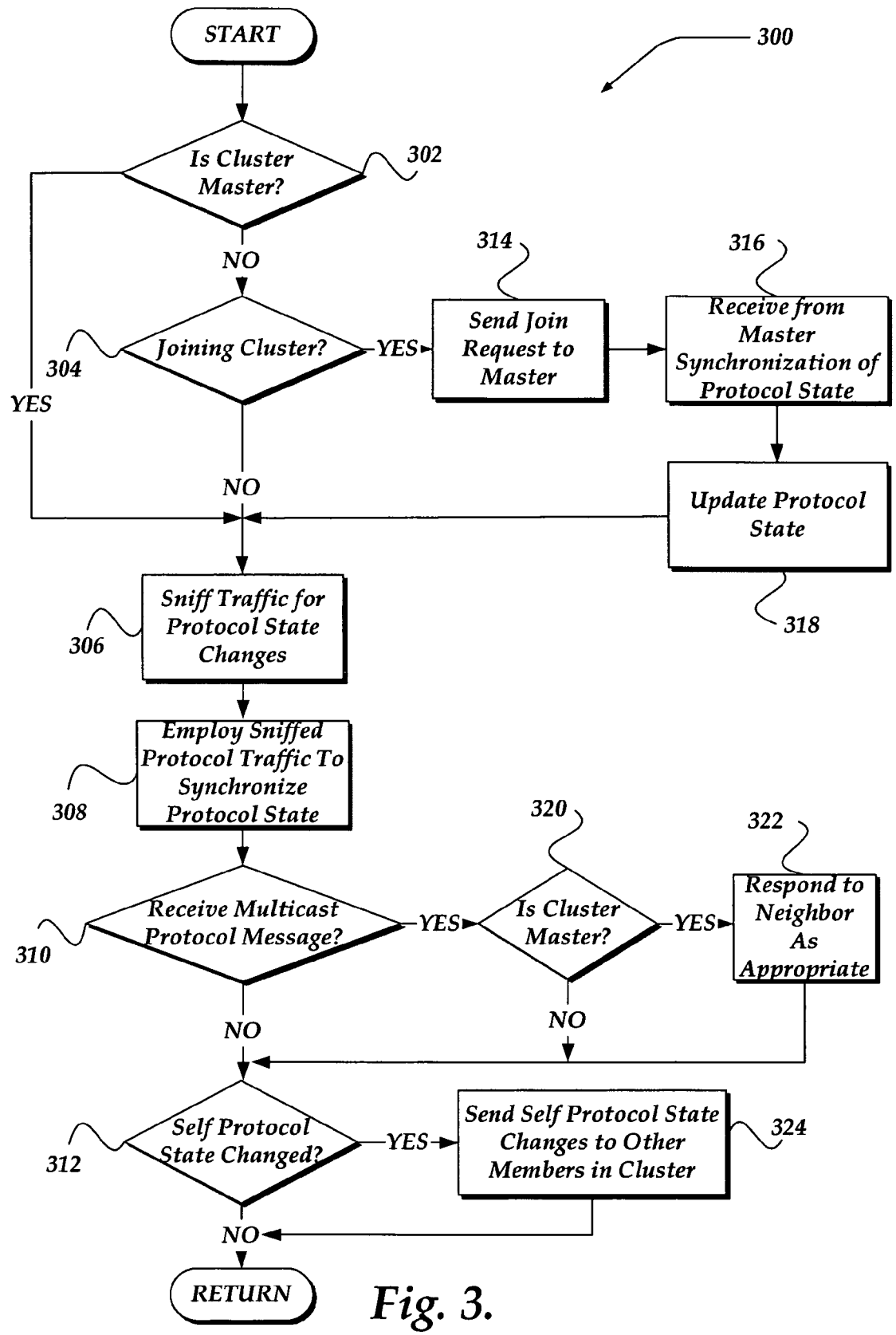
FIG. 3 illustrates a logical flow diagram generally showing one embodiment of a process for managing state synchronization between members in the multicast cluster of FIG. 1.

The operation of certain aspects of the invention will now be described with respect to FIGS. 3-4. FIG. 3 illustrates a logical flow diagram generally showing one embodiment of a process for managing state synchronization between members in a multicast routing cluster, such as shown in FIG. 1. Process 300 may, for example, be implemented in a member, and/or a master of multicast cluster 101 of FIG. 1, and/or a similar network device within a cluster arranged for multicast routing.

Process 300 begins, after a start block, at decision block 302, where a determination is made whether the network device is a cluster member. If the network device is a cluster member, the process branches to block 306; otherwise, processing continues to decision block 304.

At decision block 304, a determination is made whether the network device is just joining the cluster as a new cluster member. If the network device is a new joining cluster member, processing flows to block 314; otherwise processing continues to block 306.

At block 314, the new joining cluster member sends a request to join message to the cluster master. Processing flows then to block 316, where the new joining cluster member receives from the cluster master protocol state information to initially synchronize the new cluster member so that a lag between a new member's protocol state and that of the rest of the cluster members is minimal. Processing continues to block 318, where the newly joined cluster member employs the received protocol state information to update its protocol state, including routing tables, filters, and the like. Processing continues to block 306.

At block 306, the network device proceeds to monitor the network to acquire and maintain protocol state. Processing flows next to block 308, where the network device may employ the received protocol state information to synchronize and/or update its own protocol state information. In one embodiment, the acquired multicast control protocol packet may include a message from a neighbor network device outside of the cluster. In another embodiment, the acquired multicast control protocol packet may include a request for a response from the cluster.

Processing flows to decision block 310, where a determination is made whether a multicast control protocol message is received. Such a message may, for example, provide protocol information from a network device not within the cluster. If a multicast control protocol message is received, processing branches to decision block 320; otherwise, processing flows to decision block 312.

At decision block 320, a determination is made whether the network device is the cluster master or a cluster member. If the network device is the cluster master, processing flows to block 322; otherwise, processing proceeds to decision block 312. At block 322 the cluster master may respond to the multicast control protocol message. Processing then proceeds to decision block 312.

At decision block 312, the network device makes a determination whether its protocol state has changed such that it may share such changes with other cluster members. If its protocol state has changed, processing proceeds to block 324; otherwise, processing returns to a calling process to perform other actions. At block 324, the network device sends its protocol state changes to other members in the cluster so that another cluster member may assume its role should there be a failure. Processing then returns to the calling process to perform other actions.

Figure 4:
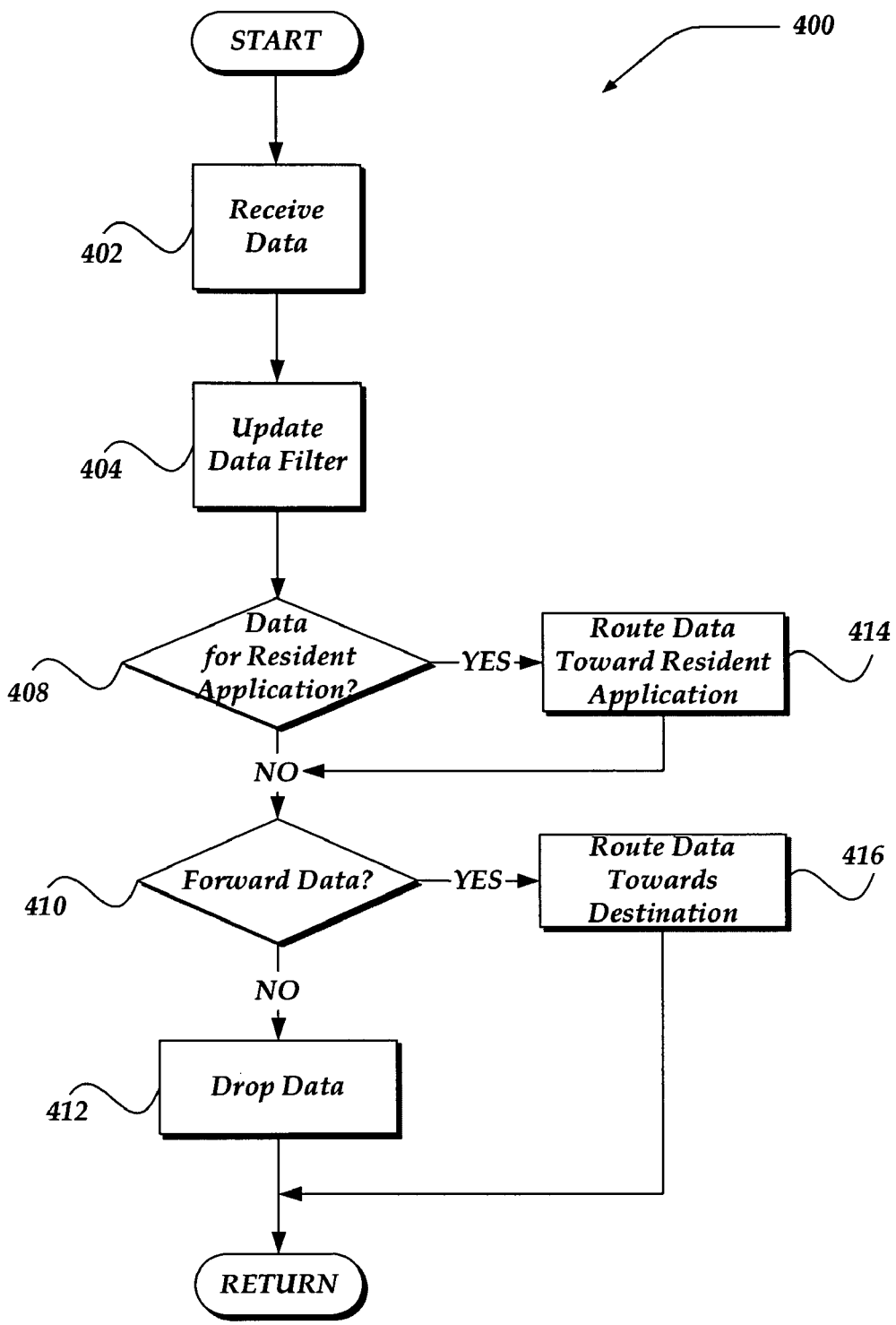
FIG. 4 illustrates a logical flow diagram generally showing one embodiment of a process of managing multicast data traffic through the multicast cluster of FIG. 1, in accordance with the invention.

FIG. 4 illustrates a logical flow diagram generally showing one embodiment for a process of managing multicast data traffic through a network device in the multicast cluster of FIG. 1, in accordance with the invention. Process 400 of FIG. 4 may operate, for example, within a cluster member, such as cluster members 102-104, and/or cluster master 105, of FIG. 1.

Process 400 begins, after a start block, at block 402, where a multicast data packet is received by the network device. Processing flows next to block 404 where the network device may employ the multicast data packet, in part, to update its data filter.

Processing continues next to decision block 408, where a determination is made whether the multicast data packet is to be received by a resident application. This may arise, for example, where the resident application has joined a group associated with the received multicast data packet. If a resident application is to receive the multicast data packet, processing continues to block 414 where the multicast data packet is routed to the resident application. In any event, processing flows next to decision block 410.

At decision block 410, a determination is made whether the received multicast data packet is to be forwarded. In one embodiment, the receiving network device may not be assigned to forward the data. This may be based on a variety of decisions, including a load balancing decision. In any event, if the network device is to forward the multicast data packet, process 400 continues to block 416, where the network device routes the multicast data packet towards its destination. Processing then returns to perform other actions.

Alternatively, if, at decision block 410, the network device is not to forward the received, multicast data packet, processing continues to block 412, where the network device drops the received multicast data packet. Processing then returns to the calling processing to perform other actions.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system, comprising:
   a first network device configured to operate as a cluster master within a cluster, the first network device being configured to
      direct sending of initial protocol state information to a cluster member when the cluster member is joining the cluster,
      direct sending of a multicast control protocol packet to at least one network device external to the cluster,
      receive a multicast data packet, and
      direct forwarding of the multicast data packet towards a destination when the first network device is associated with the multicast data packet; and
   a second network device configured to operate as the cluster member within the cluster, the second network device being configured to
      receive the initial protocol state information from the first network device during a joining of the second network device to the cluster,
      monitor the network for additional protocol state information,
      employ the additional protocol state information to update a state of the second network device when additional protocol state information is received,
      receive a multicast data packet,
      direct forwarding of the multicast data packet towards a destination when the second network device is associated with the multicast data packet,
      receive a multicast control protocol packet from the at least one network device external to the cluster, and
      drop the multicast control protocol packet rather than responding to the multicast control protocol packet.

2. The system of claim 1, wherein one of the first network device and the second network device is further configured to direct sending of a second multicast protocol state to a third network device within the cluster when the second multicast protocol state is known by the one of the first network device and the second network device and is unobtainable by the third network device within the cluster by monitoring the multicast protocol state.

3. The system of claim 2, wherein, when at least one of the first network device and the second network device fails, the other network device within the cluster assumes a workload and role of the failed network device using, at least in part, the sent second multicast protocol state.

4. The system of claim 1, wherein the second network device is further configured to determine whether the second network device is load-balanced to manage the multicast data packet when the second network device is associated with the multicast data packet.

5. The system of claim 1, wherein each of the first network device and the second network device employs a load-balancing mechanism selected from at least one of a round trip time load-balancing mechanism, a round robin load-balancing mechanism, a least connections load-balancing mechanism, a packet completion rate load-balancing mechanism, a quality of service load-balancing mechanism, a cluster topology load-balancing mechanism, a global availability load-balancing mechanism, a hops load-balancing mechanism, a hash load-balancing mechanism, a static ratios load-balancing mechanism, and a dynamic ratios load-balancing mechanism.

6. An apparatus comprising at least one processor and at least one memory including computer readable instructions, the at least one memory and the computer readable instructions configured to, with the at least one processor, cause the apparatus at least to:
   selectably direct configuring of the apparatus to operate as either a member or as a master within a cluster, wherein the selection is based on the needs of the cluster,
   monitor the network for protocol state information,
   employ the protocol state information to update a state of the apparatus when the apparatus receives protocol state information,
   receive a multicast control protocol message,
   direct responding to the multicast control protocol message when the apparatus is a cluster master,
   drop the multicast control protocol message rather than responding to the multicast control protocol message when the apparatus is other than the cluster master,
   receive a multicast data packet, and
   direct forwarding of the multicast data packet towards a destination when the apparatus is associated with the multicast data packet.

7. The apparatus of claim 6, wherein the apparatus is further caused to direct forwarding of the multicast data packet towards a resident application when the apparatus includes the resident application associated with the multicast data packet.

8. The apparatus of claim 6, wherein, when employing the additional protocol state information, the apparatus is further caused to send self protocol state information to a network device within the cluster.

9. The apparatus of claim 6, wherein the apparatus is further caused to determine whether the apparatus is load-balanced to manage the multicast data packet.

10. The apparatus of claim 6, wherein the apparatus is further caused to receive initial protocol state information from the cluster master during a joining of the cluster.

11. The apparatus of claim 6, wherein the apparatus is further caused to drop the multicast data packet when the apparatus is unassociated with the multicast data packet.

12. A method, comprising:
directing sending of initial protocol state information to a cluster member when the cluster member is joining the cluster;
directing sending, from a cluster master, of a first multicast control protocol packet to at least one network device external to the cluster;
receiving a second multicast control protocol packet from the external network device;
dropping the second multicast control protocol packet when the second multicast control protocol packet is received by the cluster member;
monitoring the network for additional protocol state information;
employing the additional protocol state information to update a state of the cluster member when additional protocol state information is received;
receiving a multicast data packet;
directing forwarding of the multicast data packet towards a destination when the cluster member is associated with the multicast data packet, receiving a multicast control protocol packet from the at least one network device external to the cluster; and
dropping the multicast control protocol packet rather than responding to the multicast control protocol packet.

13. The method of claim 12, wherein the cluster member is configured to determine whether the cluster member is load-balanced to manage the multicast data packet when the cluster member is associated with the multicast data packet.

14. The method of claim 13, wherein the cluster member is configured to employ a load-balancing mechanism selected from at least one of a round trip time load-balancing mechanism, a round robin load-balancing mechanism, a least connections load-balancing mechanism, a packet completion rate load-balancing mechanism, a quality of service load-balancing mechanism, a cluster topology load-balancing mechanism, a global availability load-balancing mechanism, a hops load-balancing mechanism, a hash load-balancing mechanism, a static ratios load-balancing mechanism, and a dynamic ratios load-balancing mechanism.

15. The method of claim 12, further comprising:
directing sending of the second multicast protocol state to another cluster member when the second multicast protocol state known by one of the cluster master and the cluster member is unobtainable by the other cluster member by monitoring the multicast protocol state.

16. The method of claim 15, wherein, when one of the cluster master and the cluster member fail, the other cluster member is configured to assume a workload and role of the failed one of the cluster master and the cluster member.

17. The method of claim 12, further comprising:
directing forwarding of the multicast data packet towards a resident application if the cluster member includes the resident application associated with the multicast data packet.

18. The method of claim 12, wherein the employing of the additional protocol state information to update the state of the cluster member further comprises updating at least one of a routing table and a filter application.

19. An apparatus, comprising:
means for selectably directing configuring of the apparatus to operate as either a member or as a master within a cluster, wherein the selection is based on the needs of the cluster;
means for monitoring a network for protocol state information; employing means for employing the protocol state information to update a state of the apparatus when protocol state information is received;
first means for receiving a multicast control protocol message; responding means for responding to the multicast control protocol message when the apparatus is a cluster master;
means for dropping the multicast control protocol message rather than responding to the multicast control protocol message when the network device is other than the cluster master;
second means for receiving a multicast data packet; and
means for forwarding the multicast data packet towards a destination when the apparatus is associated with the multicast data packet.

20. A method, comprising:
selectably directing configuring a network device to operate as either a member or as a master within a cluster, wherein the selection is based on the needs of the cluster;
monitoring a network for protocol state information;
employing the protocol state information to update a state of the network device when protocol state information is received;
receiving a multicast control protocol message;
directing responding to the multicast control protocol message when the network device is a cluster master;
dropping the multicast control protocol message rather than responding to the multicast control protocol message when the network device is other than the cluster master;
receiving a multicast data packet; and
directing forwarding of the multicast data packet towards a destination when the network device is associated with the multicast data packet.

21. The method of claim 20, further comprising:
directing forwarding of the multicast data packet towards a resident application when the network device includes the resident application associated with the multicast data packet.

22. The method of claim 20, wherein, when employing the additional protocol state information, the method further comprises sending self protocol state information to another network device within the cluster.

23. The method of claim 20, further comprising: determining whether the network device is load-balanced to manage the multicast data packet.

24. The method of claim 20, further comprising: receiving initial protocol state information from the cluster master during a joining of the cluster.

25. The method of claim 20, further comprising:
dropping the multicast data packet when the network device is unassociated with the multicast data packet.

26. A memory having a computer program embodied thereon, the program configured to control a processor to perform a process, the process comprising:
selectably directing configuring of a network device to operate as either a member or as a master within a cluster, wherein the selection is based on the needs of the cluster;
monitoring a network for protocol state information;

employing the protocol state information to update a state of the network device when protocol state information is received;

receiving a multicast control protocol message;

directing responding to the multicast control protocol message when the network device is a cluster master;

dropping the multicast control protocol message rather than responding to the multicast control protocol message when the network device is other than the cluster master;

receiving a multicast data packet; and directing forwarding of the multicast data packet towards a destination when the network device is associated with the multicast data packet.

27. The memory of claim 26, the process further comprising:

directing forwarding of the multicast data packet towards a resident application when the network device includes the resident application associated with the multicast data packet.

28. The memory of claim 26, wherein, when employing the additional protocol state information, the process further comprises controlling the processor to sending self protocol state information to another network device within the cluster.

29. The memory of claim 26, the process further comprising:

determining whether the network device is load-balanced to manage the multicast data packet.

30. The memory of claim 26, the process further comprising:

receiving initial protocol state information from the cluster master during a joining of the cluster.

31. The memory of claim 26, the process further comprising:

dropping the multicast data packet when the network device is unassociated with the multicast data packet.

32. An apparatus comprising at least one processor and at least one memory including computer readable instructions, the at least one memory and the computer readable instructions configured to, with the at least one processor, cause the apparatus at least to:

receive initial protocol state information from a cluster master during a joining of the apparatus to the cluster, monitor the network for additional protocol state information, employ the additional protocol state information to update a state of the apparatus when additional protocol state information is received, receive a multicast data packet, direct forwarding of the multicast data packet towards a destination when the apparatus is associated with the multicast data packet, receive a multicast control protocol packet from at least one network device external to the cluster, and drop the multicast control protocol packet rather than responding to the multicast control protocol packet.

33. The apparatus of claim 32, wherein the apparatus is further caused to initiate sending of a second multicast protocol state to another network device within the cluster when the second multicast protocol state is known by the one of the cluster master and the apparatus and is unobtainable by the third network device within the cluster by monitoring the multicast protocol state.

34. The apparatus of claim 33, wherein, when the apparatus fails, a network device other than the apparatus within the cluster assumes a workload and role of the apparatus using, at least in part, the sent second multicast protocol state.

35. The apparatus of claim 32, wherein the apparatus is further caused to determine whether the apparatus is load-balanced to manage the multicast data packet when the apparatus is associated with the multicast data packet.

36. The apparatus of claim 32, wherein the apparatus is caused to employ a load-balancing mechanism selected from at least one of a round trip time load-balancing mechanism, a round robin load-balancing mechanism, a least connections load-balancing mechanism, a packet completion rate load-balancing mechanism, a quality of service load-balancing mechanism, a cluster topology load-balancing mechanism, a global availability load-balancing mechanism, a hops load-balancing mechanism, a hash load-balancing mechanism, a static ratios load-balancing mechanism, and a dynamic ratios load-balancing mechanism.

37. A method, comprising:

receiving initial protocol state information from a cluster master during a joining of a cluster member to the cluster;

monitoring the network for additional protocol state information;

employing the additional protocol state information to update a state of the cluster member when additional protocol state information is received;

receiving a multicast data packet;

directing forwarding of the multicast data packet towards a destination when the cluster member is associated with the multicast data packet;

receiving a multicast control protocol packet from at least one network device external to the cluster; and dropping the multicast control protocol packet rather than responding to the multicast control protocol packet.

38. The method of claim 37, further comprising:

directing sending of a second multicast protocol state to another network device within the cluster when the second multicast protocol state is known by the one of the cluster master and the cluster member and is unobtainable by another network device within the cluster by monitoring the multicast protocol state.

39. The method of claim 38, wherein, when the cluster member fails, a network device within the cluster other than the cluster member assumes a workload and role of the cluster member using, at least in part, the sent second multicast protocol state.

40. The method of claim 37, further comprising: determining whether the cluster member is load-balanced to manage the multicast data packet when the cluster member is associated with the multicast data packet.

41. The method of claim 37, further comprising:

employing a load-balancing mechanism selected from at least one of a round trip time load-balancing mechanism, a round robin load-balancing mechanism, a least connections load-balancing mechanism, a packet completion rate load-balancing mechanism, a quality of service load-balancing mechanism, a cluster topology load-balancing mechanism, a global availability load-balancing mechanism, a hops load-balancing mechanism, a hash load-balancing mechanism, a static ratios load-balancing mechanism, and a dynamic ratios load-balancing mechanism.

42. An apparatus, comprising:

first means for receiving initial protocol state information from a cluster master during a joining of a cluster member to the cluster;

means for monitoring the network for additional protocol state information;

means for employing the additional protocol state information to update a state of the cluster member when additional protocol state information is received;

second means for receiving a multicast data packet;

means for forwarding the multicast data packet towards a destination when the cluster member is associated with the multicast data packet;

third means for receiving a multicast control protocol packet from at least one network device external to the cluster; and means for dropping the multicast control protocol packet rather than responding to the multicast control protocol packet.

43. A memory having a computer program embodied thereon, the program configured to control a processor to perform a process, the process comprising:

receiving initial protocol state information from a cluster master during a joining of a cluster member to the cluster;

monitoring the network for additional protocol state information;

employing the additional protocol state information to update a state of the cluster member when additional protocol state information is received;

receiving a multicast data packet;

directing forwarding of the multicast data packet towards a destination when the cluster member is associated with the multicast data packet;

receiving a multicast control protocol packet from at least one network device external to the cluster; and dropping the multicast control protocol packet rather than responding to the multicast control protocol packet.

44. The memory of claim 43, the process further comprising:

directing sending of a second multicast protocol state to another network device within the cluster when the second multicast protocol state is known by the one of the cluster master and the cluster member and is unobtainable by another network device within the cluster by monitoring the multicast protocol state.

45. The memory of claim 44, wherein, when the cluster member fails, a network device within the cluster other than the cluster member assumes a workload and role of the cluster member using, at least in part, the sent second multicast protocol state.

46. The memory of claim 43, the process further comprising:

determining whether the cluster member is load-balanced to manage the multicast data packet when the cluster member is associated with the multicast data packet.

47. The memory of claim 43, the process further comprising:

employing a load-balancing mechanism selected from at least one of a round trip time load-balancing mechanism, a round robin load-balancing mechanism, a least connections load-balancing mechanism, a packet completion rate load-balancing mechanism, a quality of service load-balancing mechanism, a cluster topology load-balancing mechanism, a global availability load-balancing mechanism, a hops load-balancing mechanism, a hash load-balancing mechanism, a static ratios load-balancing mechanism, and a dynamic ratios load-balancing mechanism.

* * * * *